United States Patent
Tran et al.

(10) Patent No.: US 8,576,517 B1
(45) Date of Patent: Nov. 5, 2013

(54) MAGNETIC RECORDING TRANSDUCER HAVING SIDE SHIELDS BETWEEN THE COILS AND THE AIR-BEARING SURFACE

(75) Inventors: Ut Tran, San Jose, CA (US); Zhigang Bai, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/597,091

(22) Filed: Aug. 28, 2012

Related U.S. Application Data

(62) Division of application No. 12/198,657, filed on Aug. 26, 2008, now Pat. No. 8,276,258.

(51) Int. Cl.
   *G11B 5/127* (2006.01)
(52) U.S. Cl.
   USPC .................................. 360/319; 360/125.03
(58) Field of Classification Search
   USPC ............... 360/319, 125.03, 125.16, 125.3
   See application file for complete search history.

(56) References Cited

U.S. PATENT DOCUMENTS

| | | | |
|---|---|---|---|
| 6,497,825 B1 | 12/2002 | Kamijima | |
| 6,943,993 B2 | 9/2005 | Chang et al. | |
| 6,949,833 B2 | 9/2005 | O'Kane et al. | |
| 6,954,340 B2 | 10/2005 | Shukh et al. | |
| 6,975,486 B2 | 12/2005 | Chen et al. | |
| 6,980,403 B2 | 12/2005 | Hasegawa | |
| 7,002,775 B2 * | 2/2006 | Hsu et al. | 360/125.03 |
| 7,024,756 B2 | 4/2006 | Le et al. | |
| 7,042,682 B2 | 5/2006 | Hu et al. | |
| 7,067,066 B2 | 6/2006 | Sasaki et al. | |
| 7,070,698 B2 | 7/2006 | Le | |
| 7,075,756 B1 | 7/2006 | Mallary et al. | |
| 7,124,498 B2 | 10/2006 | Sato | |
| 7,193,815 B1 | 3/2007 | Stoev et al. | |
| 7,239,479 B2 | 7/2007 | Sasaki et al. | |
| 7,295,401 B2 | 11/2007 | Jayasekara et al. | |
| 7,296,339 B1 | 11/2007 | Yang et al. | |
| 7,322,095 B2 | 1/2008 | Guan et al. | |
| 7,337,530 B1 | 3/2008 | Stoev et al. | |
| 7,444,740 B1 | 11/2008 | Chung et al. | |
| 7,508,627 B1 | 3/2009 | Zhang et al. | |
| 7,551,396 B2 * | 6/2009 | Hsu et al. | 360/125.3 |
| 7,558,019 B2 * | 7/2009 | Le et al. | 360/125.06 |
| 7,587,811 B2 | 9/2009 | Balamane et al. | |
| 7,712,206 B2 * | 5/2010 | Jiang et al. | 29/603.16 |
| 7,804,666 B2 | 9/2010 | Guan et al. | |
| 7,894,159 B2 * | 2/2011 | Lengsfield et al. | 360/125.03 |
| 7,920,358 B2 | 4/2011 | Jiang et al. | |
| 8,000,064 B2 | 8/2011 | Kawano et al. | |
| 8,015,692 B1 | 9/2011 | Zhang et al. | |

(Continued)

OTHER PUBLICATIONS

Mallary et al., "One Terabit per Square Inch Perpendicular Recording Conceptual Design", IEEE Transactions on Magnetics, vol. 38, No. 4, pp. 1719-1724, Jul. 2002.

(Continued)

*Primary Examiner* — Angel Castro

(57) ABSTRACT

A magnetic recording transducer is provided. The magnetic recording transducer comprises a main pole including a nose portion, the nose portion terminating at an air-bearing surface (ABS). The magnetic recording transducer further comprises at least one coil having a coil front distal from the ABS, and at least one side shield. The at least one side shield extends from at the ABS to not further than the coil front.

9 Claims, 11 Drawing Sheets

(56) References Cited

U.S. PATENT DOCUMENTS

| | | | |
|---|---|---|---|
| 8,035,930 B2 * | 10/2011 | Takano et al. | 360/319 |
| 8,049,989 B2 * | 11/2011 | Jiang et al. | 360/125.09 |
| 8,139,320 B2 * | 3/2012 | Hsiao et al. | 360/125.07 |
| 8,164,853 B2 | 4/2012 | Hirata et al. | |
| 8,166,631 B1 | 5/2012 | Tran et al. | |
| 8,231,796 B1 | 7/2012 | Li et al. | |
| 8,276,258 B1 | 10/2012 | Tran et al. | |
| 8,300,359 B2 | 10/2012 | Hirata et al. | |
| 8,488,272 B1 | 7/2013 | Tran et al. | |
| 2002/0071208 A1 | 6/2002 | Batra et al. | |
| 2004/0032692 A1 | 2/2004 | Kobayashi | |
| 2004/0156148 A1 | 8/2004 | Chang et al. | |
| 2005/0057852 A1 | 3/2005 | Yazawa et al. | |
| 2005/0068669 A1 | 3/2005 | Hsu et al. | |
| 2006/0044681 A1 | 3/2006 | Le et al. | |
| 2006/0044682 A1 | 3/2006 | Le et al. | |
| 2006/0082924 A1 | 4/2006 | Etoh et al. | |
| 2006/0098334 A1 | 5/2006 | Jayasekara et al. | |
| 2006/0198049 A1 | 9/2006 | Sasaki et al. | |
| 2007/0035878 A1 | 2/2007 | Guthrie et al. | |
| 2007/0035885 A1 | 2/2007 | Im et al. | |
| 2007/0115584 A1 | 5/2007 | Balamane et al. | |
| 2007/0146929 A1 | 6/2007 | Maruyama et al. | |
| 2007/0146931 A1 | 6/2007 | Baer et al. | |
| 2007/0177301 A1 | 8/2007 | Han et al. | |
| 2007/0186408 A1 | 8/2007 | Nix et al. | |
| 2007/0211384 A1 | 9/2007 | Hsiao et al. | |
| 2007/0217069 A1 | 9/2007 | Okada et al. | |
| 2007/0245545 A1 | 10/2007 | Pentek et al. | |
| 2007/0247749 A1 | 10/2007 | Bonhote et al. | |
| 2007/0253107 A1 | 11/2007 | Mochizuki et al. | |
| 2007/0258167 A1 | 11/2007 | Allen et al. | |
| 2007/0263324 A1 | 11/2007 | Allen et al. | |
| 2007/0268626 A1 | 11/2007 | Taguchi et al. | |
| 2007/0268627 A1 | 11/2007 | Le et al. | |
| 2008/0113090 A1 | 5/2008 | Lam et al. | |
| 2008/0113514 A1 | 5/2008 | Baer et al. | |
| 2008/0253035 A1 | 10/2008 | Han et al. | |
| 2008/0297945 A1 | 12/2008 | Han et al. | |
| 2009/0002885 A1 | 1/2009 | Sin | |
| 2009/0109570 A1 | 4/2009 | Scholz et al. | |
| 2009/0147410 A1 | 6/2009 | Jiang et al. | |
| 2009/0168236 A1 | 7/2009 | Jiang et al. | |
| 2010/0061016 A1 | 3/2010 | Han et al. | |
| 2011/0304939 A1 | 12/2011 | Hirata et al. | |

OTHER PUBLICATIONS

Office Action dated Mar. 19, 2012 from U.S. Appl. No. 12/198,657, 23 pages.

Notice of Allowance dated Jun. 6, 2012 from U.S. Appl. No. 12/198,657, 9 pages.

* cited by examiner

ABS View

Plan View

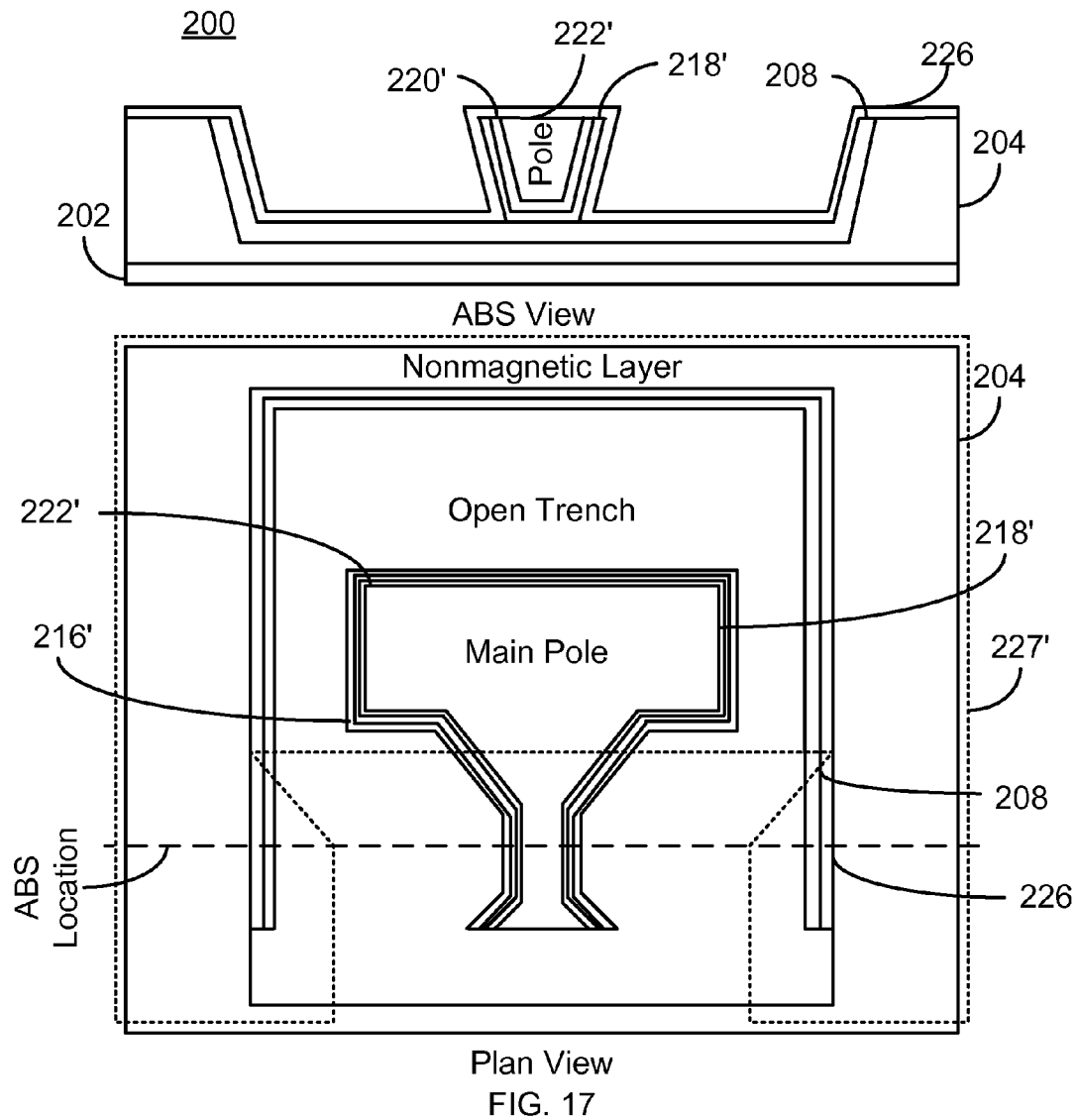
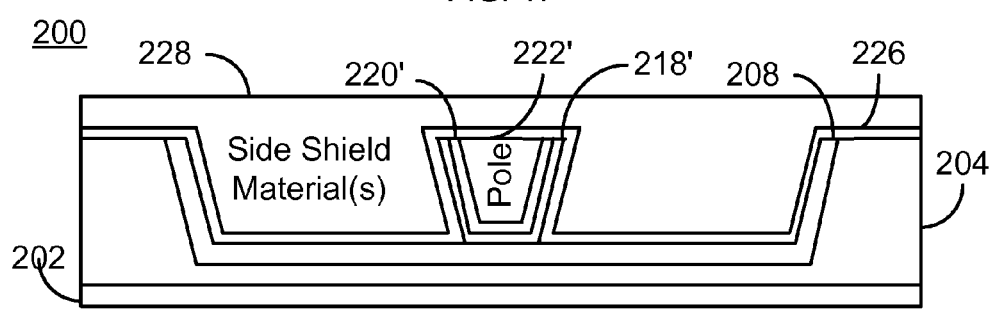
FIG. 17
FIG. 18

MAGNETIC RECORDING TRANSDUCER HAVING SIDE SHIELDS BETWEEN THE COILS AND THE AIR-BEARING SURFACE

CROSS REFERENCED TO RELATED APPLICATIONS

This application is a divisional of U.S. patent application Ser. No. 12/198,657, filed on Aug. 26, 2008, which is hereby incorporated by reference in its entirety.

BACKGROUND

Side shields, as well as top shields may be desired in conventional magnetic recording transducers, particular perpendicular magnetic recording (PMR) transducers. Side shields in combination with top shields that surround the sides and top of the main PMR pole are termed wrap-around shields. FIG. 1 depicts a conventional method 10 for fabricating such a conventional PMR transducer having a wrap-around shield. The method 10 allows fabrication of the side shields without requiring the main pole to be trimmed.

The conventional method 10 commences by blanket depositing a magnetic material used for the conventional side shield, via step 12. Step 12 includes plating a NiFe layer. A trench for the conventional main pole is formed in the NiFe layer, via step 14. The trench for the conventional main pole has a reverse angle. Thus, the top of the trench is wider than the bottom of the trench. The trench is formed in step 14 by performing a NiFe reactive ion etch (RIE). A nonmagnetic layer is then deposited in the trench, via step 16. The nonmagnetic layer is used to form a side gap between the side shield and the conventional main pole. The conventional main pole may then be provided on the nonmagnetic layer, via step 18. Typically, step 18 includes depositing the material for the conventional main pole followed by a planarization, such as a chemical mechanical planarization (CMP). Fabrication of the conventional transducer may then be completed. For example, a write gap, top shield, coils, and other components may be fabricated.

FIG. 2 depicts air-bearing surface (ABS) and side views of a conventional, magnetic transducer 50. For clarity, FIG. 2 is not drawn to scale and only certain structures are depicted. The conventional transducer 50 includes a conventional side shield 52, a conventional nonmagnetic layer 54, and a conventional main pole 56. The conventional nonmagnetic layer 54 separates the conventional main pole 56 from the conventional side shield 52. Also shown are a write gap 58 and conventional top shield 60. Conventional coils 62 are depicted by dotted lines in the plan view of the conventional transducer 50.

Although the conventional method 10 allows the conventional transducer 50 to be fabricated, there are several drawbacks. The NiFe RIE performed in step 14 may be difficult to control. In particular, forming a trench having the desired reverse angle and other features may be problematic. The conventional side shield 52 also surrounds the conventional main pole 56. As a result, it may be difficult to separately control the geometry of the conventional side shield 52 and the geometry of the conventional main pole 56. In addition, because of the location of the coils 62, the conventional side shield 52 may be at least partially driven by the current through the coils 62. As a result, performance of the conventional side shield 52 may suffer.

Accordingly, what is needed is a system and method for improving the fabrication of a magnetic recording head having side shields.

BRIEF SUMMARY OF THE INVENTION

A method and system provide a magnetic transducer that includes an underlayer and a first nonmagnetic layer on the underlayer. The method and system include providing a first trench in the first nonmagnetic layer. The first trench has at least one edge corresponding to at least one side shield. The method and system also include providing a second nonmagnetic layer in the first trench and providing a second trench in the second nonmagnetic layer. The method and system include providing the main pole. At least a portion of the main pole resides in the second trench. The method and system further include removing at least a portion of the second nonmagnetic layer residing between the edge(s) and the main pole. The method and system also provide the side shield(s) in the first trench. The side shield(s) extend from at least an air-bearing surface location to not further than a coil front location.

BRIEF DESCRIPTION OF SEVERAL VIEWS OF THE DRAWINGS

FIGS. 8-23 depict exemplary embodiments of magnetic recording transducers during fabrication.

DETAILED DESCRIPTION OF THE PREFERRED EMBODIMENTS

Figure 1:
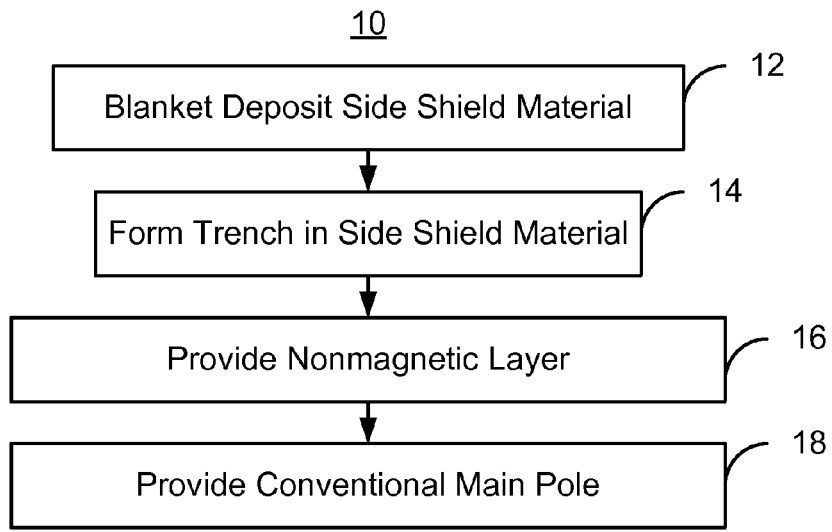
FIG. 1 is a flow chart depicting a conventional method for fabricating a magnetic recording transducer.
Figure 2:
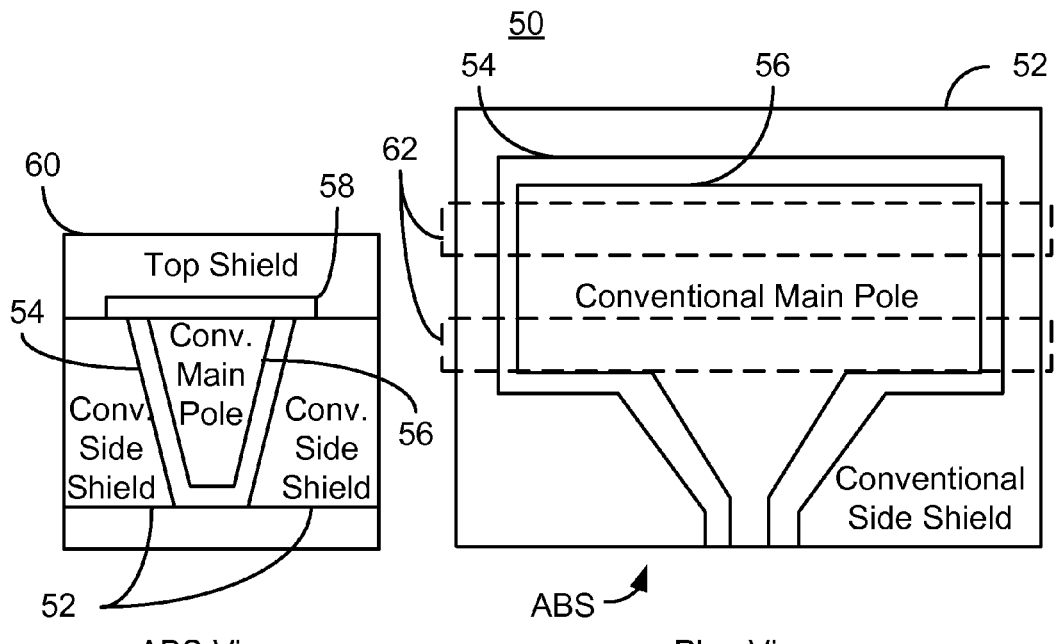
FIG. 2 depicts plan and ABS views of a conventional magnetic recording head.
Figure 3:
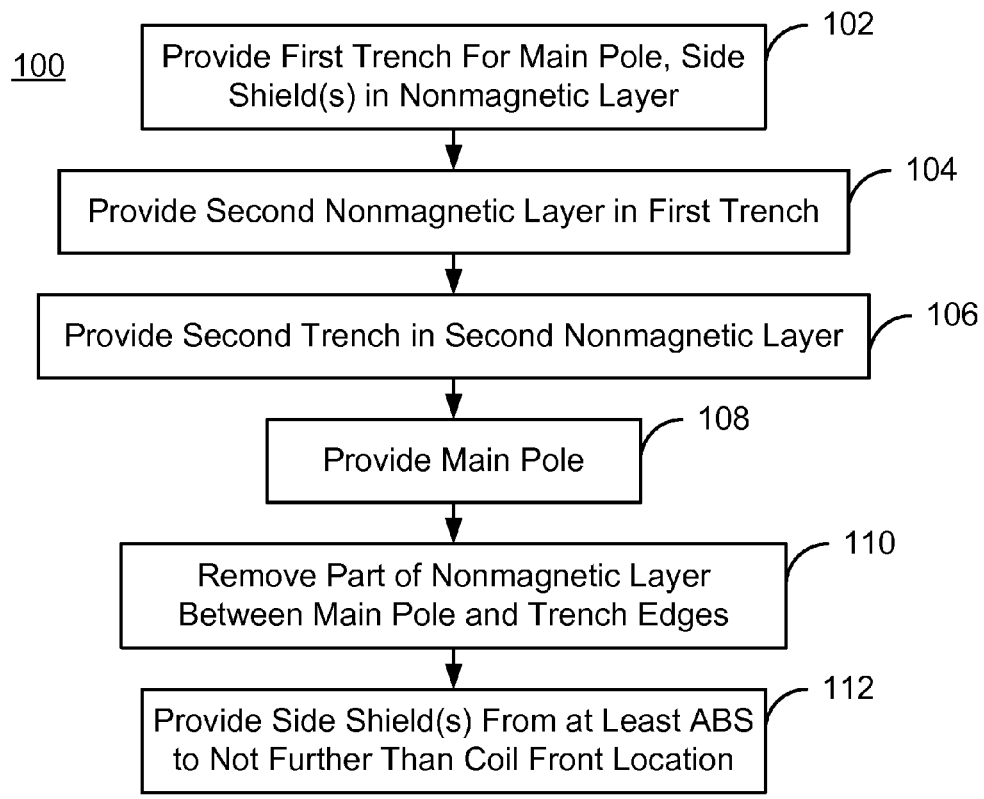
FIG. 3 is a flow chart depicting an exemplary embodiment of a method for fabricating a magnetic recording transducer having side shields.

FIG. 3 is an exemplary embodiment of a method 100 for providing magnetic recording transducer having side shields. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 commences after formation of an underlayer and a first nonmagnetic layer on the underlayer. The underlayer is nonmagnetic and may be an RIE stop layer. In one embodiment, the first nonmagnetic layer is an insulator, such as aluminum oxide.

A first trench is provided in the first nonmagnetic layer, via step 102. The edges of the first trench correspond to the side shield(s) being provided. More specifically, the edges of the first trench correspond to the locations of the outer edges of the side shield(s). In one embodiment, step 102 includes providing a mask having an aperture corresponding to the location of the trench. Portions of the nonmagnetic layer may then be removed. The removal may use a RIE, such as an aluminum oxide RIE. In such an embodiment, the underlayer may form the bottom of the trench because the underlayer may be a RIE stop layer. However, in another embodiment, the stop layer may be omitted. The mask used to form the trench may then be removed.

A second nonmagnetic layer is provided in the trench, via step 104. In one embodiment, step 104 includes providing a stop layer in the first trench, then refilling the first trench with the second nonmagnetic layer. The stop layer may be a reactive ion etch stop layer and may include materials such as Ru. In one embodiment, the second nonmagnetic layer includes the same material(s) as the first nonmagnetic layer. However, in another embodiment, different magnetic materials may be used.

A second trench is provided in the second nonmagnetic layer, via step 106. The second trench corresponds to the main pole. In one embodiment, step 106 includes performing a RIE such as an aluminum oxide RIE. In such an embodiment, the bottom of the second trench may reside at the stop layer. The second trench provided in step 106 may also have a reverse angle. Stated differently, the top of the second trench may be wider than the bottom of the second trench. Note that because the first and second trenches are formed separately, the sidewalls of these trenches may make different angles with the underlying surface.

A main pole is provided, via step 108. In one embodiment, at least a portion of the main pole resides in the second trench. Step 108 may include depositing nonmagnetic material(s) prior to the main pole. The nonmagnetic material(s) may include layer(s) used to adjust the track width of the main pole and/or planarization stop layer(s), such as Ru. Step 108 may also include blanket depositing the magnetic materials, as well as any seed layers, and performing a planarization. Finally, the main pole provided in step 108 may include one or more bevels. For example, the main pole may include no bevel, a bottom bevel, a top bevel, or both.

At least a portion of the second nonmagnetic layer residing between the edge(s) of the first trench and the main pole is removed, via step 110. Step 110 may include masking the main pole, then removing the remaining portion of the second nonmagnetic layer. In one embodiment, step 110 is accomplished via a wet etch. In such an embodiment, the nonmagnetic layer(s) that may be provided in step 108 may protect the sides of the main pole from the etchant. In addition, a mask protecting the main pole may be made sufficiently wide that although the main pole is protected, at least part of the second nonmagnetic layer between the main pole and the edge of the first trench is removed.

The side shield(s) may then be provided in the first trench, via step 112. The side shields are provided such that the side shield(s) extend from at least an ABS location to not further than a coil front location. An ABS location is the region which will become the ABS, for example by lapping another part down to the ABS location or by some other means. The coil front location is the location closest to the ABS location that any coil used in driving the main pole extends. To perform step 112, a portion of the magnetic recording transducer distal from the ABS may be masked using a side shield mask. The material(s) for the side shield may then be deposited. After deposition of the side shield material(s), the transducer may also be planarized as part of step 112. As a result, the side shields have the desired location. Fabrication of the magnetic transducer may then be completed. For example, a write gap, top shield, and coils may be fabricated.

Figure 4:
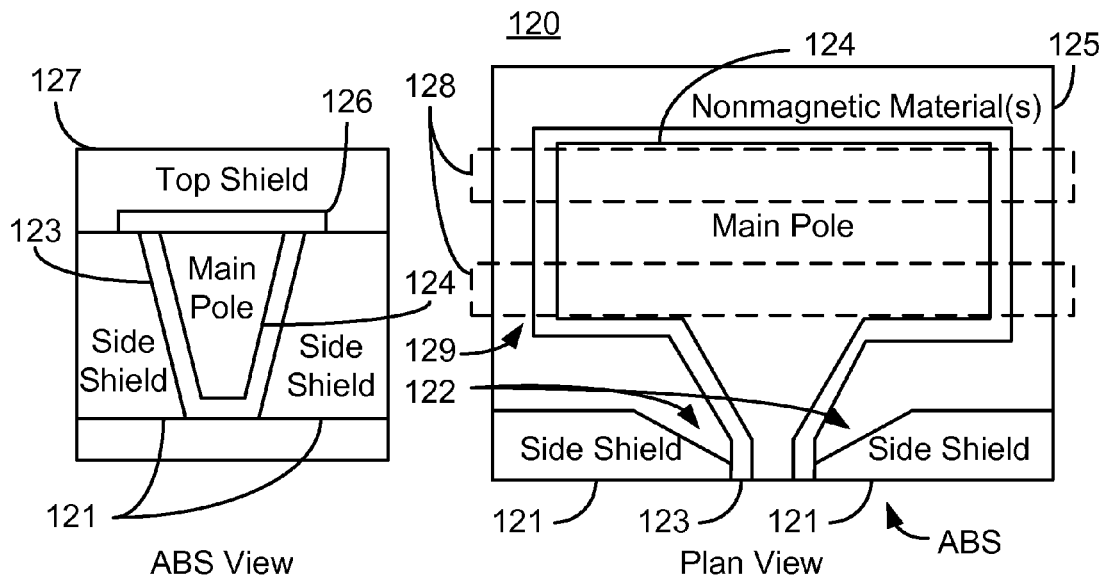
FIG. 4 depicts plan and ABS views of an exemplary embodiment of a magnetic recording transducer having side shields.

FIG. 4 depicts plan and ABS views of an exemplary embodiment of a magnetic recording transducer 120 having side shields and formed using the method 100. The transducer 120 may be part of a head including a slider and which is part of a disk drive. The magnetic transducer 120 includes nonmagnetic material(s), such as aluminum oxide, in which the first trench is formed in step 102. The magnetic transducer 120 includes side shields 121 and main pole 124 formed in steps 108 and 112. In addition, because of step 110, the nonmagnetic material(s) 125 have been removed from the ABS and thus are not shown in the ABS view. Also shown are nonmagnetic layers 123 that may be provided in step 108 and used to isolate the main pole 124 from the side shields 121 as well as to adjust the track width of the main pole 124. The transducer 120 also includes write gap 126, top shield 127, and coils 128. Although two coils 128 are shown, in another embodiment, another number of coils and/or turns per coil may be provided. As can be seen in FIG. 4, the side shields 121 and top shield 127 may meet, forming a wrap-around shield for the magnetic transducer 120. However, in another embodiment, the write gap 126 might be extended so that the top shield 127 is separated from the side shields 121. Further, the bottom of the main pole 124 is not closer to the underlayer than the side shields 121. Thus, the bottom of the main pole 124 is at the same height or higher than the bottom of the side shields 121. Further, although not shown in FIG. 4, the outer edges of the side shields 121 may have an angle that is different from the main pole 124. This is because the second trench for the main pole 124 and first trench corresponding to the side shields 121 may be formed separately.

Figure 5:
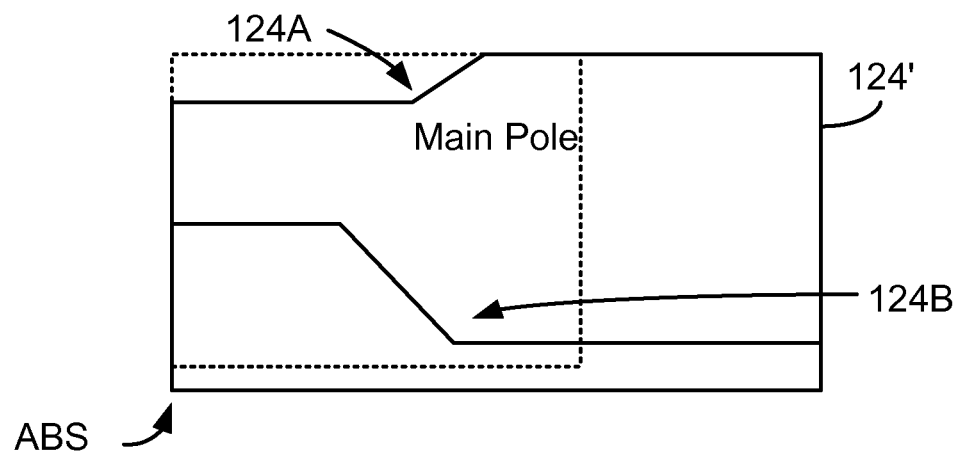
FIG. 5 depicts a side view of an exemplary embodiment of a magnetic recording transducer having side shields.

In addition, FIG. 5 depicts a side view of an exemplary embodiment of the transducer 120' in which the main pole 124' include bevels. Portions of the transducer 120' are analogous to the transducer 120 and are, therefore, labeled similarly. For clarity, the coils 128 are not shown. The side shields 121' are shown in dotted lines. As shown in FIG. 5, the main pole 124' includes bevels 124A and 124B. Bevel 124A is a bottom bevel, while bevel 124B is a top bevel. In other embodiments, the main pole 12' could include only the bottom bevel 124B or only the top bevel 124A.

Using the method 100, the transducer 120 may be formed. As a result, side shields 121 that extend from the ABS to not past the coil front location 129 are provided. In one embodiment, the side shields 121 extend at least fifty nanometers and not more than 1.5 micrometers from the ABS. In another embodiment, the side shields extend not more than 0.9 micrometers from the ABS. In another embodiment, the side shields 121 may extend less than fifty nanometers from the ABS, for example, to the nose length or less. In the embodiment shown, the side shields 121 terminate well before the coils 128/coil front location 129. As a result, coils 128 used to drive the main pole 124 may be decoupled from the side shields 121. Consequently, performance of the transducer 120 may be improved. Further, the geometry of the side shields 121 may be separately tailored. In particular, canted corners 122 may be formed. In addition, other geometries may also be fabricated. Further, the first and second trenches are formed in separates steps 102 and 106. Thus, the outer sidewalls of the trenches and thus the main pole 124 and side shields 121 may be separately tailored. For example, the sidewalls may form different angles with the surface of underlayer. Thus, the method 100 also improves the flexibility of fabrication of the transducer 120. Further, because the main pole 124 is formed in a trench in the nonmagnetic materials 125, fabrication of the transducer 120 is more robust. Consequently, manufacturability of the transducer 120 may be improved. In addition, because the side shields 121 may extend below the bottom of the main pole 124, the ability of the side shields 121 to reduce adjacent track writing by the main pole 124, particularly at a skew angle, may be improved.

Figure 6:
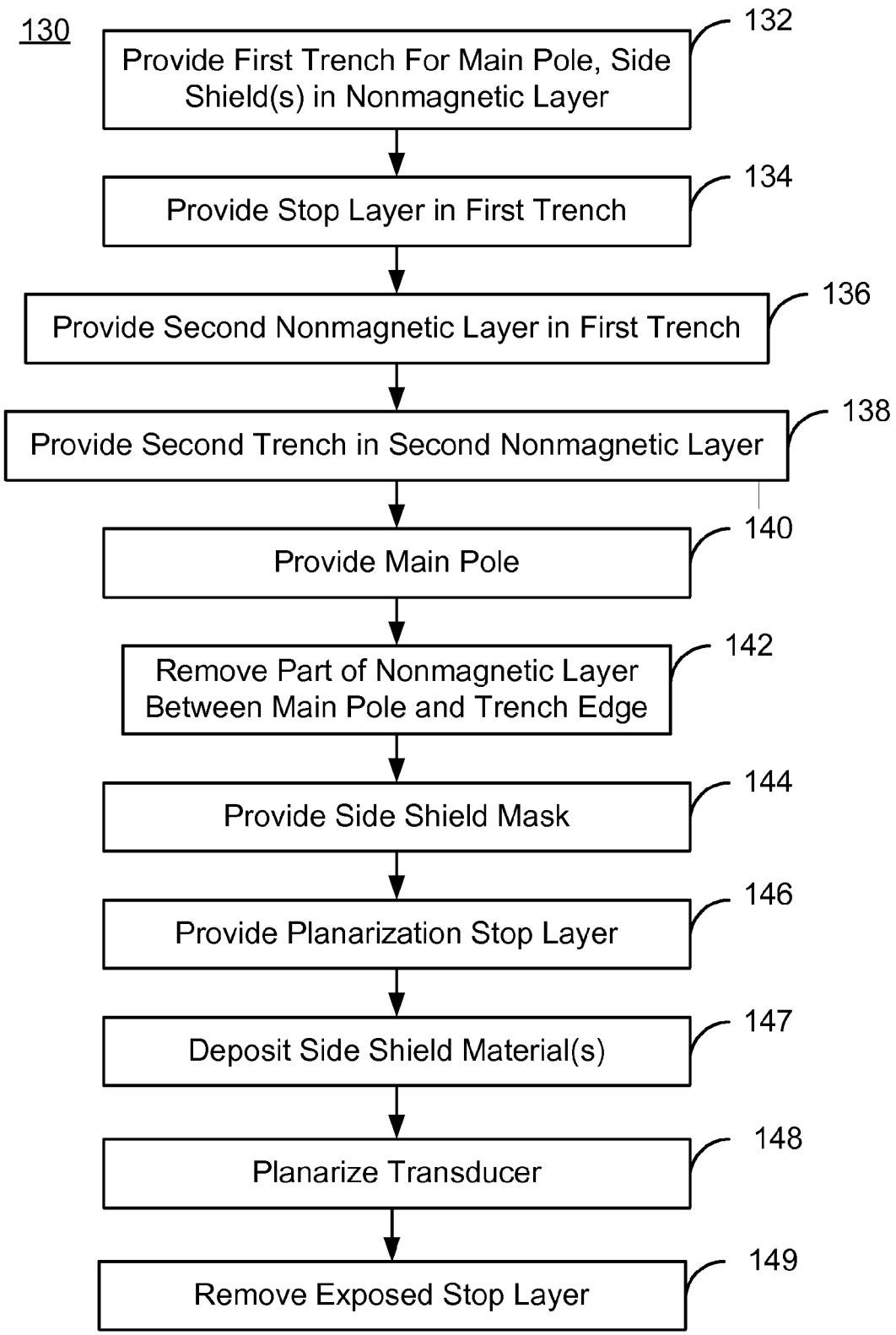
FIG. 6 is a flow chart depicting another exemplary embodiment of a method for fabricating a magnetic recording transducer having side shields.

FIG. 6 is a flow chart depicting another exemplary embodiment of a method 130 for fabricating a magnetic recording transducer having side shields. For simplicity, some steps may be omitted. The method 130 is also described in the context of providing a single recording transducer. However, the method 130 may be used to fabricate multiple transducers and/or multiple poles at substantially the same time. The method 130 is also described in the context of particular layers. A particular layer may include multiple materials and/or multiple sublayers. The method 130 also may start after formation of other portions of the magnetic recording transducer. For example, the method 130 commences after formation of an underlayer and a nonmagnetic layer on the underlayer. The underlayer is nonmagnetic and may be an RIE stop layer. In one embodiment, the nonmagnetic layer is an insulator, such as aluminum oxide.

A first trench is provided in the nonmagnetic layer, via step 132. Step 132 is analogous to step 102. A central portion of the first trench corresponds to the main pole that is to be formed. The two edges of the trench correspond to the side shields being provided. In one embodiment, the sides of the trench mark the locations of the outer edges of the side shields to be formed. In one embodiment, step 132 includes providing a mask having an aperture corresponding to the location of the trench. Portions of the nonmagnetic layer may then be removed using a RIE, such as an aluminum oxide RIE.

A stop layer is provided in the trench, via step 134. In such an embodiment, the stop may reside at the bottom of the first trench because the stop may be a RIE stop layer. A second nonmagnetic layer is provided in the trench, via step 136. The second nonmagnetic layer may include aluminum oxide. The second nonmagnetic layer is provided in step 136 and resides on the stop layer. A second trench is provided in the second nonmagnetic layer, via step 138. In one embodiment, the second trench is provided in step 138 using an aluminum oxide RIE. The second trench thus may have a bottom that is not lower than the stop layer provided in step 134.

A main pole is provided, via step 140. In one embodiment, at least a portion of the main pole resides in the second trench. Step 140 may include depositing nonmagnetic material(s) prior to the main pole material(s). The nonmagnetic material(s) may include layer(s) used to adjust the track width of the main pole and/or planarization stop layer(s). The track width adjustment layer may include aluminum oxide that may be deposited using atomic layer deposition (ALD). The planarization stop layer(s) may include Ru. In one such embodiment, the Ru may also be used to adjust the track width of the main pole. Step 140 may also include blanket depositing the magnetic materials for the main pole, as well as any seed layers, and performing a planarization. The main pole provided in step 140 may include one or more bevels. For example, the main pole may include no bevel, a bottom bevel, a top bevel, or both. In such an embodiment, the top bevel may be provided by removing a portion of the magnetic materials in proximity to the ABS. The bottom bevel may be provided by removing a portion of the bottom of the first trench formed in step 132 distal from the ABS. In an alternate embodiment, a bottom bevel may be provided by filling of the second trench in proximity to the ABS using the nonmagnetic layer(s). In another embodiment, the top and/or bottom bevels may be formed in another manner.

At least a portion of the second nonmagnetic layer between the edges of the trench and the main pole are removed, via step 142. In one embodiment, step 142 is accomplished via a wet etch. In such an embodiment, the nonmagnetic layer(s) that may be provided in step 140 may protect the sides of the main pole from the etchant. In addition, a mask protecting the main pole may be made sufficiently wide that although the main pole is protected, at least part of the nonmagnetic layer between the main pole and the mask for the trench is exposed to the etchant.

A side shield mask is provided, via step 144. The side shield mask extends from at least a coil front location distal from the ABS location. Thus, only a portion of the magnetic transducer that will be from the coil front location to at least the ABS is uncovered. A planarization stop layer is provided, via step 146. A portion of the planarization stop layer covers the main pole, an exposed portion of the underlayer, and an exposed portion of the nonmagnetic layer. Thus, at least a portion of the planarization stop layer resides under the side shields.

At least one side shield material is then deposited, via step 147. Step 147 includes deposition of a magnetic material. The magnetic recording transducer is planarized, via step 148. The planarization may be terminated before the planarization stop layer provided in step 146 is removed. Thus, a portion of the side shield material(s) that is outside of the first trench is removed. Consequently, the side shields may be provided. An exposed portion of the planarization stop layer may be removed, via step 149. Fabrication of the magnetic transducer may then be completed. For example, a write gap, top shield, and coils may be fabricated.

Using the method 130, a transducer, such as the transducer 120, may be formed. As a result, side shields that extend from the ABS to not past the coil front location are provided. The geometry of these side shields may also be separately tailored. Further, because the main pole is formed in a trench in the nonmagnetic materials, fabrication of the transducer is more robust. The side shields may also improve adjacent track writing issues. Consequently, performance and fabrication of the transducer may be improved.

Figure 7:
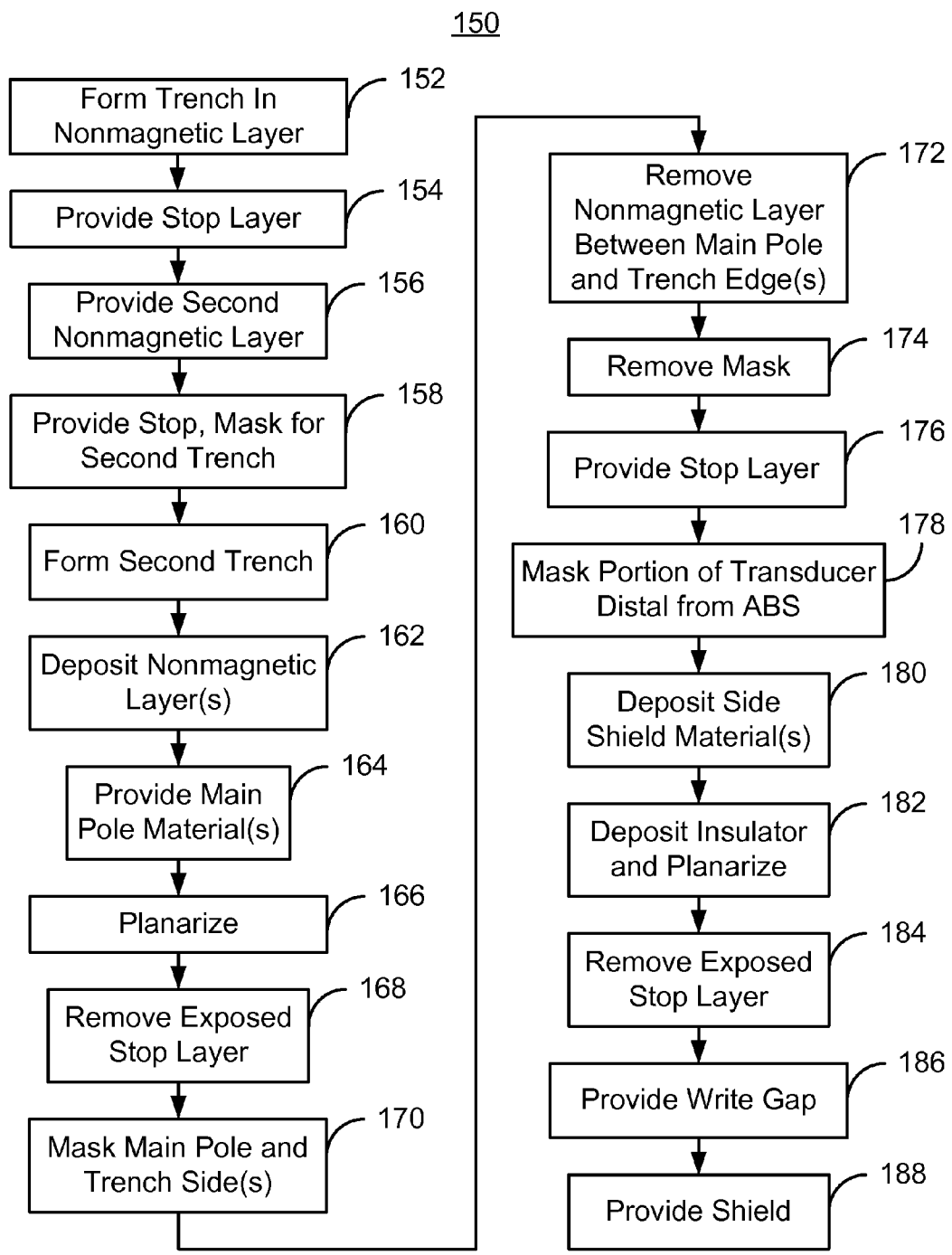
FIG. 7 is a flow chart depicting another exemplary embodiment of a method for fabricating a magnetic recording transducer having side shields.

FIG. 7 is a flow chart depicting another exemplary embodiment of a method 150 for fabricating a magnetic recording transducer having side shields. For simplicity, some steps may be omitted. FIGS. 8-23 depict exemplary embodiments of a magnetic recording transducer 200 during fabrication. Referring to FIGS. 7-23, the method 150 is described in the context of the transducers 200. The magnetic transducer 200 is not drawn to scale. Further, only certain components are shown. The method 150 is also described in the context of providing a single recording transducer. However, the method 150 may be used to fabricate multiple transducers and/or multiple poles at substantially the same time. The method 150 is also described in the context of particular layers. A particular layer may include multiple materials and/or multiple sublayers. The method 150 also may start after formation of other portions of the magnetic recording transducer. For example, the method 150 commences after formation of an underlayer and a first nonmagnetic layer on the underlayer. In another embodiment, the underlayer may be omitted. In one embodiment, the first nonmagnetic layer is an insulator, such as aluminum oxide.

Figure 8:
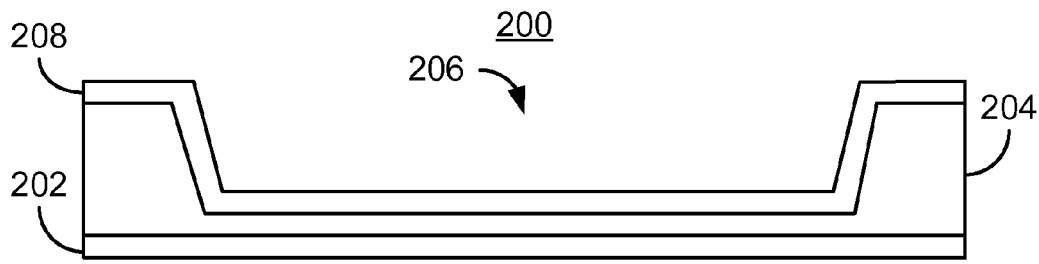

A first trench is formed in the first nonmagnetic layer, via step 152. Step 152 includes forming a mask, such as a photoresist mask, with a pattern for the trench to be provided in the nonmagnetic layer. An aluminum oxide RIE, or other suitable process, is used to remove an exposed portion of the first nonmagnetic layer. An etch stop layer is provided in the trench, via step 154. In one embodiment, step 154 includes removing the mask used in forming the first trench prior to deposition of the stop layer. In one embodiment, the stop layer includes Ru. FIG. 8 depicts an ABS view of the magnetic transducer 200 after step 154 is performed. The underlayer 202, first nonmagnetic layer 204, trench 206, and etch stop layer 208 are shown. The edges of the trench 206 correspond to the outer edges of the side shields to be formed. In the embodiment shown, the main pole is to be formed in the central region of the trench 206. However, in another embodiment, the main pole may be formed at another location in the trench 206. In FIGS. 8-23, the bottom of the first trench 206 is depicted as being above the underlayer 202. However, in another embodiment, the bottom of the first trench 206 may be formed by a portion of the underlayer 202.

Figure 9:
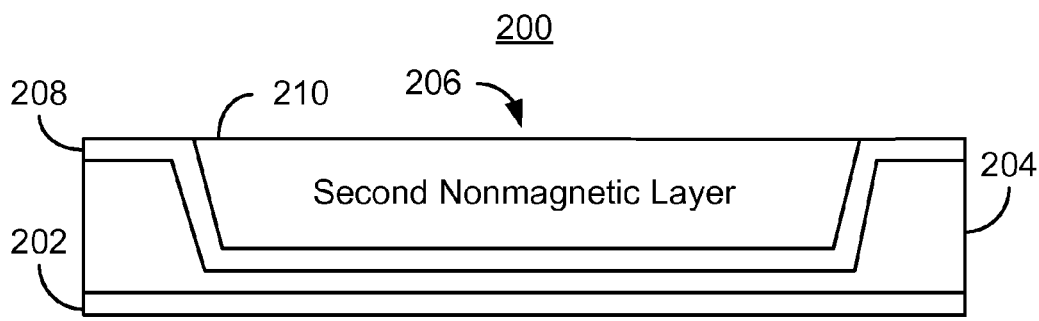

A second nonmagnetic layer is provided, via step 156. In one embodiment, step 156 includes depositing an aluminum oxide layer and performing a planarization, such as a CMP, to planarize the surface. FIG. 9 depicts the transducer 200 after step 156 is completed. Thus, the second nonmagnetic layer 210 resides in the trench 206.

Figure 10:
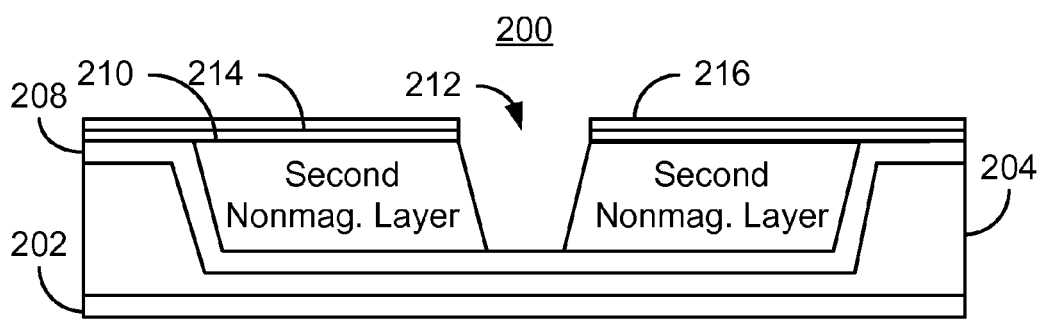

A mask for a second trench is provided, via step 158. In one embodiment, step 158 includes depositing a planarization stop layer, such as Ru, and providing a photoresist mask having an aperture corresponding to the second trench. A trench is the provided in the second nonmagnetic layer, via step 160. Step 160 may be completed by performing an aluminum oxide RIE. FIG. 10 depicts an ABS view of the transducer 200 after step 160 is completed. Thus, a photoresist mask 216 and planarization stop layer 214 are shown. In addition, a trench 212 has been provided. For clarity, the first trench 206 is no longer denoted by a reference number. In the embodiment shown, the etch stop layer 208 may form the bottom of the trench 212.

Figure 11:
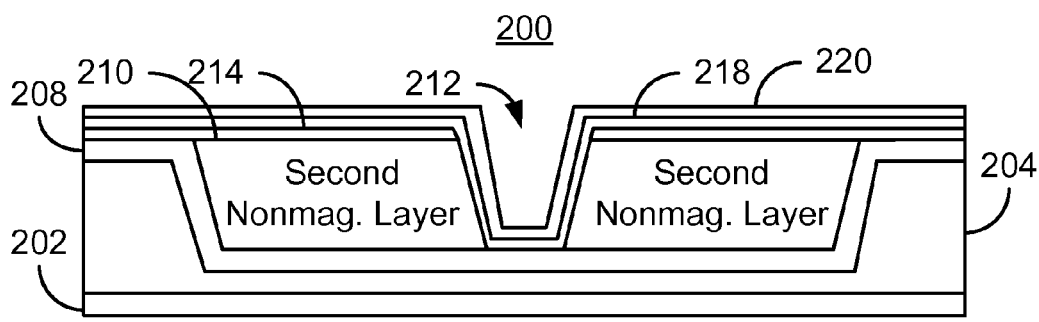

Nonmagnetic layer(s) are provided, via step 162. Prior to step 162, the mask 216 may be removed. The nonmagnetic material(s) provided in step 162 may include layer(s) used to adjust the track width of the main pole and/or planarization stop layer(s). FIG. 11 depicts the magnetic transducer 200 after step 162 is performed. Thus, a planarization stop layer 218 and track width adjustment layer 220 are shown. Step 162 may include using ALD to provide the track width adjustment layer 220 and depositing a Ru layer as the planarization stop layer 218. In one embodiment, the planarization stop layer 218 may double as the track width adjustment layer.

Figure 12:
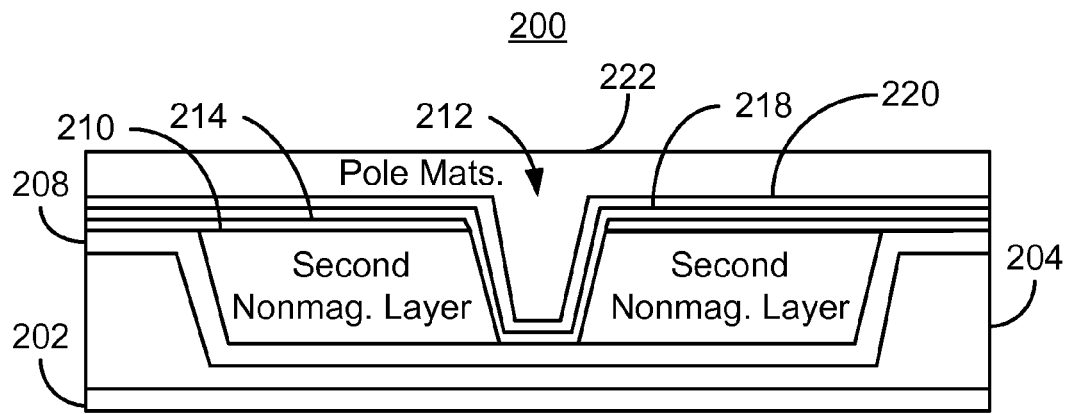

A main pole material(s) are provided, via step 164. Step 164 may include plating magnetic materials. In addition, a seed layer might be provided. FIG. 12 depicts the transducer 200 after step 164 is provided. Magnetic material(s) 222 are thus shown. In one embodiment, at least a portion of the main pole material(s) 222 resides in the trench 212. Thus, at least a portion of the main pole being formed will reside in the first trench 212.

Figure 13:
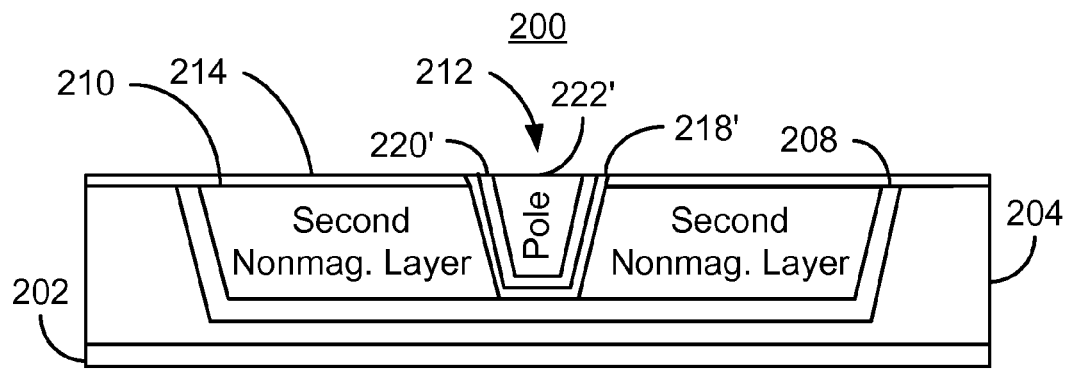

The magnetic material 220 may then be planarized, via step 166. FIG. 13 depicts the transducer 200 after step 166 is performed. Thus, a majority of the magnetic material 222 outside of the trench 212 has been removed. In addition, the top surface of the transducer 200 is planarized. Thus, portions of the nonmagnetic layers 218' and 220' and pole 222' remain. The main pole 222' may include one or more bevels. For example, the main pole may include no bevel, a bottom bevel, a top bevel, or both. In such an embodiment, the top bevel may be provided by removing a portion of the magnetic materials in proximity to the ABS. The bottom bevel may be provided by removing a portion of the bottom of the first trench formed in step 152 distal from the ABS.

Figure 14:
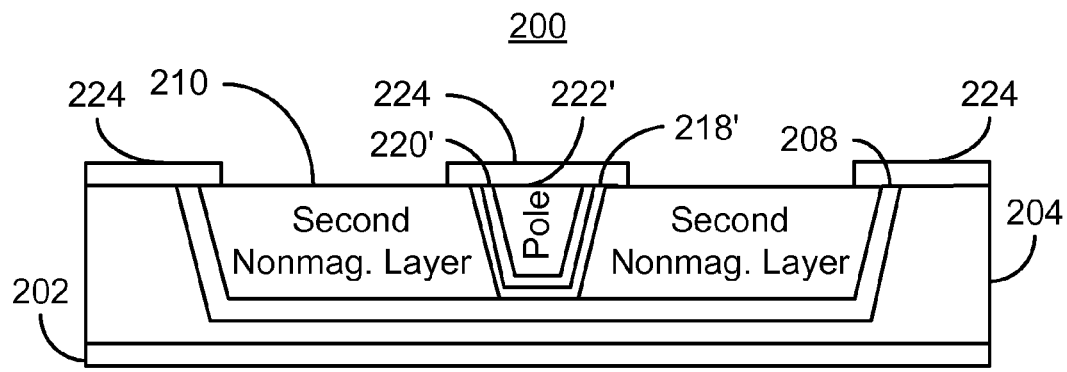

At least a portion of the etch stop layer 214 residing between outer edges of the trench 206 and the main pole 222' is removed, via step 168. Step 168 may be performed by ion milling. The main pole 222' and sides of the trench 206 are masked, via step 170. Step 170 may include providing a photoresist mask having apertures over a portion of the second nonmagnetic layer 210. FIG. 14 depicts an ABS view of the transducer 200 after step 170 is performed. Thus, the main pole 222' and nonmagnetic layers 218' and 220' remain. In addition, mask 224 has been provided. The mask 224 covers the pole 222', the edges of the first trench 206, and at least a portion of the remaining first nonmagnetic layer 204. However, the second nonmagnetic layer 210 is exposed.

Figure 15:
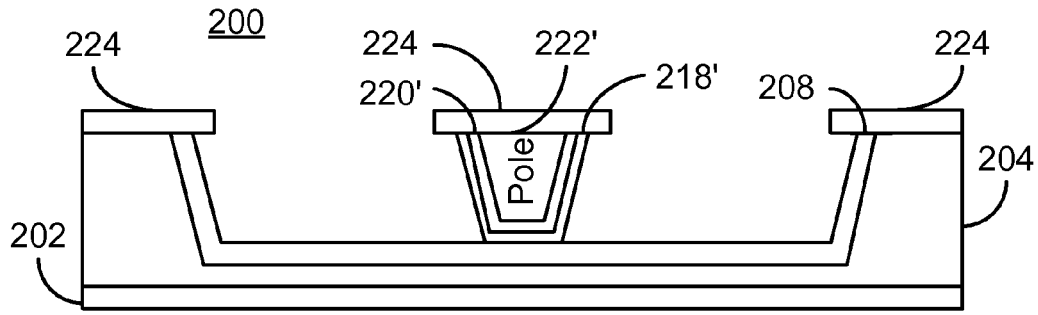

The portion of the second nonmagnetic layer 210 between the main pole 222'' and the mask 224 at the edges of the trench 206 is removed, via step 172. In one embodiment, step 172 is accomplished via a wet etch. In such an embodiment, the nonmagnetic layer(s) 218' and 220' in combination with the portion of the mask 224 on the main pole 222' may protect the main pole 222' from the etchant. FIG. 15 depicts the transducer 200 after step 172 is performed. Thus, the second nonmagnetic layer 210 has been removed.

Figure 16:
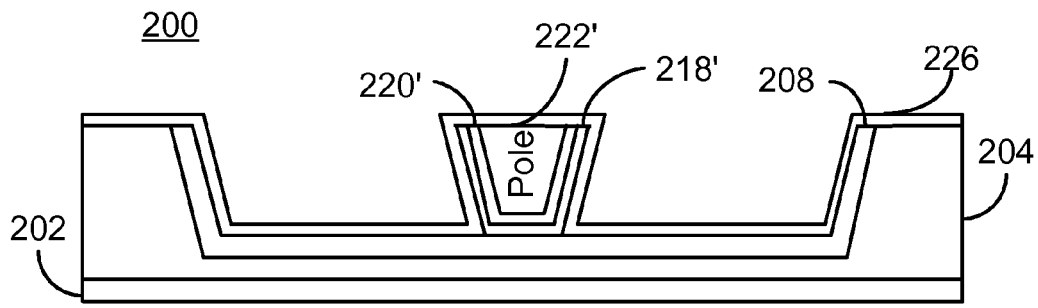
Figure 16:
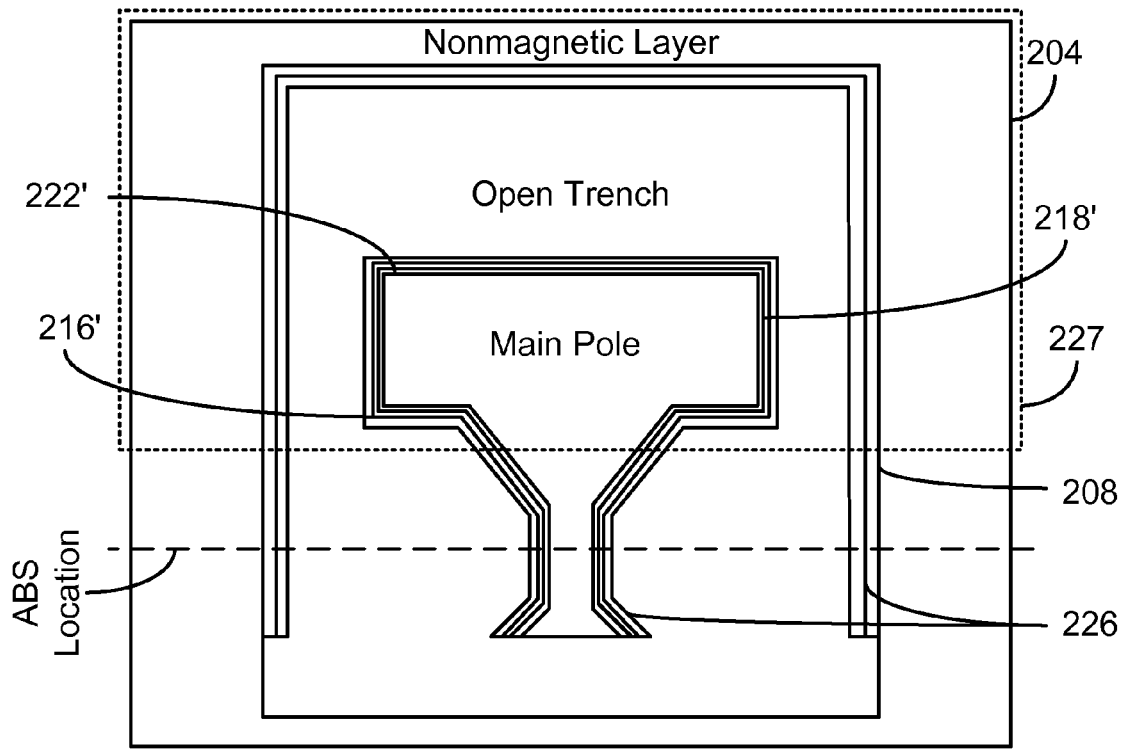

At least the portion of the mask 224 that covers the trench edges is removed, via step 174. In one embodiment, step 174 includes stripping the photoresist mask 224. Thus, the top of the nonmagnetic layer that correspond to the outside edges of the side shields are exposed. In addition, an etch stop layer is provided in the trench 206, via step 176. In one embodiment, step 176 includes depositing a Ru layer. The portion of the transducer 200 distal from the ABS is also covered with a side shield mask, via step 178. FIG. 16 depicts ABS and plan views of one embodiment of the transducer 200 after step 178 is performed. Thus, a stop layer 226 has been formed. In addition, a side shield mask 227 (shown in dotted lines) distal from the ABS location has been provided. This side shield mask 227 covers the portion of the transducer 200 on which the side shield is not desired to be provided. In the embodiment shown in FIG. 16, the side shield mask 227 has a simple geometry. FIG. 17 depicts ABS and plan views of another embodiment of the transducer 200 after step 178 is performed. Thus, a side shield mask 227' (shown in dotted lines) distal from the ABS location has been provided. This side shield mask 227' also covers the portion of the transducer 200 on which the side shield is not desired to be provided. However, the geometry of the side shield mask 227' is more complex and includes canted corners.

Figure 19:
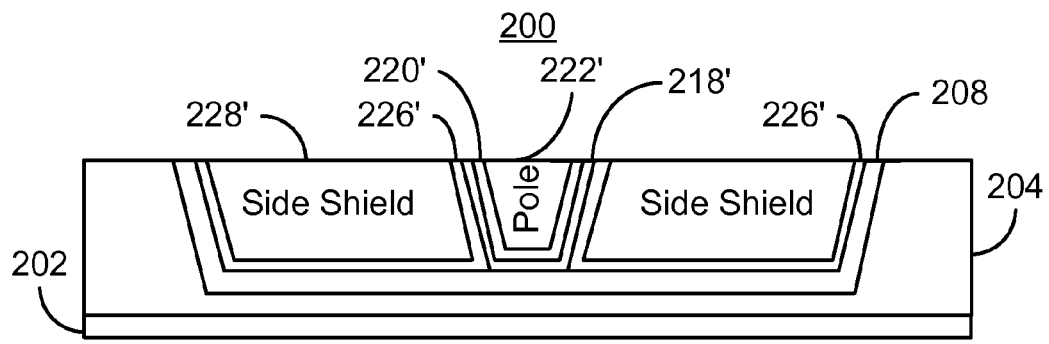

At least one side shield material is then deposited, via step 180. FIG. 18 depicts the transducer 200 after step 180 is performed. Thus, magnetic materials 228 for the side shield are depicted. The magnetic transducer 200 is refilled with a nonmagnetic material and planarized, via step 182. In addition, the nonmagnetic materials provided in step 182 may be the same as for the first nonmagnetic layer 204. The planarization performed in step 182 may be CMP. The planarization may be terminated before the planarization stop layer 226' is removed. The exposed portion of the stop layer 226 is removed, via step 184. FIG. 19 depicts the transducer 200 after step 184 is performed. Consequently, the side shields 228' and main pole 222' may be provided. In addition, only the portion of the stop layer 226' within the trench 206 remains. Thus, the sides shields 228' are surrounded on its sides by the stop layer 226'.

Figure 20:
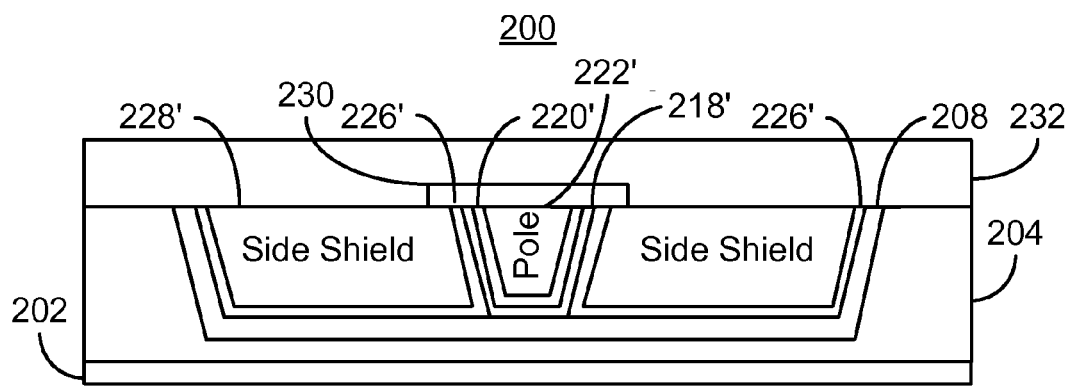
Figure 21:
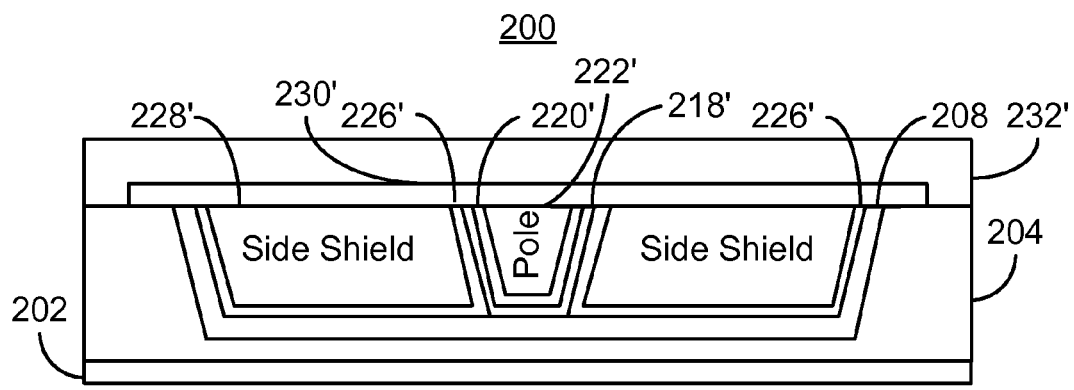

A write gap is provided in step 186. In addition, a top shield may be provided in step 188. FIGS. 20 and 21 depict embodiments of the transducer 200 as seen at the ABS. In the embodiment shown in FIG. 20, the write gap 230 and top shield 232 have been provided. The write gap 230 extends across the main pole 222', but allows the side shields 228' to physically connect with the top shield 232. Consequently, a wrap-around shield is formed. In the embodiment shown in FIG. 21, the write gap 230' extends across the side shields 228'. Thus, the side shields 228' are separate from the top shield 232'. In addition, because the first trench 206 and stop layer 208 provided therein are formed first, the bottom of the side shields 228' are not lower than the bottoms of the main pole 222'. In addition, the trenches 206 and 212 for the main pole 222' and side shields are formed separately. As a result, the outer sidewalls of the side shields 228' and the main pole 222' may form different angles with horizontal (e.g. the underlayer 202 surface). Further, in the embodiment shown, the stop layers 226' and 208 substantially surround the bottom and sides of the side shields 228'. However, the stop layer 208 may not reside on the sides of the main pole 222'.

Figure 22:
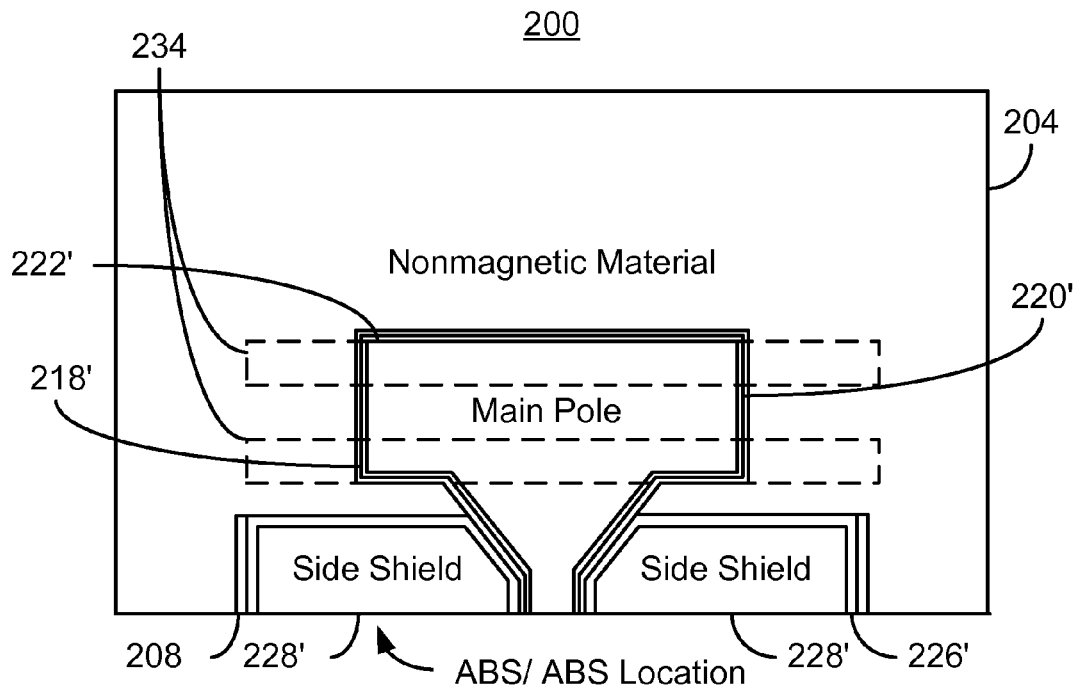
Figure 23:
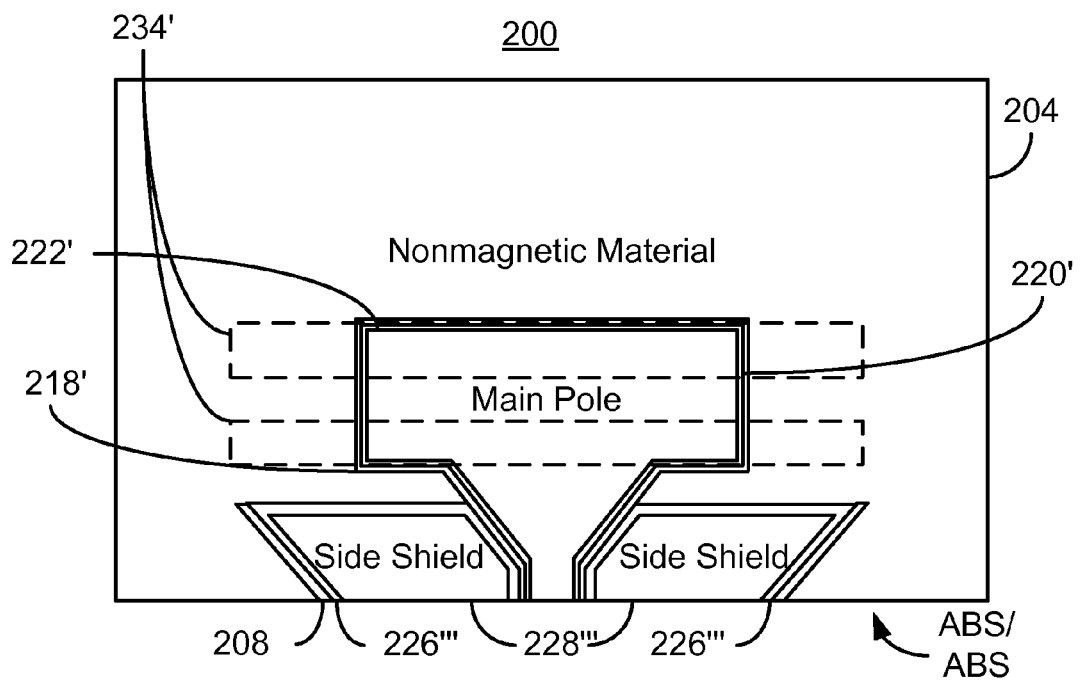

Fabrication of the transducer 200 may then be completed. For example, the transducer 200 may be lapped to the ABS location. In addition, coil(s) may be provided. FIGS. 22-23 depict two embodiments of the transducer 200 corresponding to the side shield mask 227 and 227', respectively. In both, coils 234/234' have been provided and the transducers 200 have been lapped to the ABS. As can be seen in FIGS. 22-23, although the main pole geometry is the same for both drawings, the side shields 228' and 228" have different geometries. However, neither side shields 228' nor side shields 228" extend past the front of the coils 234/234'.

Using the method 150, transducers 200 may be formed. As a result, side shields 2287228" that extend from the ABS to not past the coil 234/234' front location are provided. The geometry of these side shields 2287228" may also be separately tailored. Further, because the main pole 222' is formed in a trench in the nonmagnetic materials, fabrication of the transducer 200 is more robust. In addition, because the side shields 2287228" may extend to or below the bottom of the main pole 222/222', the ability of the side shields 2287228" to reduce adjacent track writing may also be improved. Consequently, performance and fabrication of the transducer may be improved.

We claim:

1. A magnetic recording transducer comprising:
   a main pole including a nose portion terminating at an air-bearing surface (ABS), at least one magnetic layer having a bottom and a plurality of sides, and at least one nonmagnetic layer, the at least one nonmagnetic layer substantially surrounding bottom and the plurality of sides of the at least one magnetic layer;
   at least one coil having a coil front distal from the ABS;
   at least one side shield, the at least one side shield extending from at the ABS to not further than the coil front;
   wherein the at least one nonmagnetic layer further includes at least one of a planarization stop layer and a nonmagnetic track width adjustment layer.

2. The magnetic recording transducer of claim 1 wherein the main pole further includes at least one bevel.

3. The magnetic recording transducer of claim 1 further including a planarization stop layer residing between the main pole at the at least one side shield.

4. The magnetic recording transducer of claim 1 wherein the at least one side shield further includes at least one canted corner.

5. The magnetic recording transducer of claim 1 further comprising:
   a write gap, at least a portion of the write gap residing on the main pole; and
   a top shield, at least a portion of the top shield residing on the main pole.

6. The magnetic recording transducer of claim 1 wherein the main pole resides on an underlayer, wherein the at least one side shield includes a side shield bottom, wherein the main pole includes a main pole bottom, and wherein the side shield bottom is not further from the underlayer than the main pole bottom.

7. The magnetic recording transducer of claim 1 wherein the main pole resides on an underlayer, wherein the at least one side shield includes a first side forming a first angle with the underlayer, the main pole includes a second side forming a second angle with the underlayer, the first angle being different from the second angle.

8. The magnetic recording transducer of claim 1 wherein the at least one side shield further includes a side, the magnetic recording transducer further comprising:
   a wet etch stop layer, a portion of the wet etch stop layer adjacent to the side of the at least one side shield.

9. A disk drive comprising:
   a slider including a magnetic transducer, the magnetic transducer including
   a main pole including a nose portion terminating at an air-bearing surface (ABS), at least one magnetic layer having a bottom and a plurality of sides, and at least one nonmagnetic layer, the at least one nonmagnetic layer substantially surrounding bottom and the plurality of sides of the at least one magnetic layer, the at least one nonmagnetic layer further including at least one of a planarization stop layer and a nonmagnetic track width adjustment layer;
   at least one coil having a coil front distal from the ABS;
   at least one side shield, the at least one side shield extending from at the ABS to not further than the coil front.

* * * * *